United States Patent
Yoshizawa

(10) Patent No.: US 10,146,420 B2
(45) Date of Patent: Dec. 4, 2018

(54) ELECTRONIC DEVICE, GRAPH DISPLAY METHOD AND STORAGE MEDIUM FOR PRESENTING AND MANIPULATING TWO DIMENSIONAL GRAPH OBJECTS USING TOUCH GESTURES

(71) Applicant: CASIO COMPUTER CO., LTD., Tokyo (JP)

(72) Inventor: Hiroaki Yoshizawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 142 days.

(21) Appl. No.: 14/295,597

(22) Filed: Jun. 4, 2014

(65) Prior Publication Data
US 2014/0365954 A1     Dec. 11, 2014

(30) Foreign Application Priority Data

Jun. 11, 2013 (JP) .................................. 2013-122775

(51) Int. Cl.
*G06F 3/0485* (2013.01)
*G06F 15/02* (2006.01)
(Continued)

(52) U.S. Cl.
CPC ........ *G06F 3/0485* (2013.01); *G06F 3/04883* (2013.01); *G06F 15/02* (2013.01); *G06T 11/206* (2013.01)

(58) Field of Classification Search
CPC ............. G06F 3/04845; G06F 3/04842; G06F 3/0485; G06F 3/0488; G06F 3/0482;
(Continued)

(56) References Cited

U.S. PATENT DOCUMENTS 4,794,554 A  *  12/1988  Tamiya ............... G06F 3/04845
                                                              345/440
5,936,612 A  *   8/1999  Wang .................... G06F 3/0312
                                                              345/163
(Continued)

FOREIGN PATENT DOCUMENTS

| CN | 100337183 C | 9/2007 |
| JP | 2004-094596 A | 3/2004 |
| JP | 2004-126759 A | 4/2004 |

OTHER PUBLICATIONS

Chinese Office Action dated Oct. 8, 2016 for Chinese Patent Application No. 201410256041.7 and English translation of the same. (18 pages).

*Primary Examiner* — Renee D Chavez
*Assistant Examiner* — Jeremy L Stanley
(74) *Attorney, Agent, or Firm* — Fitch, Even, Tabin & Flannery LLP

(57) ABSTRACT

An electronic device includes a display device and a processor. The display device includes a touch panel. The processor (i) generates a graph image to be displayed on the display device, (ii) when the generated graph image is displayed on the display device, acquires an object specified by a user, the object being contained in the graph image, and (iii) when the user performs a touch operation on the displayed graph image, changes a display style of the graph image according to a type of the acquired object and displays the graph image in the changed display style.

9 Claims, 7 Drawing Sheets

(51) Int. Cl.
*G06T 11/20* (2006.01)
*G06F 3/0488* (2013.01)

(58) Field of Classification Search
CPC ....... G06F 3/04892; G06F 2203/04808; G06F 2203/04803; G06F 2203/04806
See application file for complete search history.

(56) References Cited

U.S. PATENT DOCUMENTS

| | | | | |
|---|---|---|---|---|
| 6,064,401 | A * | 5/2000 | Holzman | G06F 3/0485 345/440 |
| 7,369,127 | B1 * | 5/2008 | Hull | G06T 11/206 345/440 |
| 8,527,909 | B1 * | 9/2013 | Mullany | G06F 3/0484 345/173 |
| 9,098,942 | B2 * | 8/2015 | Yoshimoto | G06T 11/206 |
| 2001/0017624 | A1 * | 8/2001 | Noettling | G06T 19/00 345/421 |
| 2002/0080150 | A1 * | 6/2002 | Nakatani | G06F 3/0485 345/660 |
| 2002/0126099 | A1 * | 9/2002 | Engholm | G01R 13/20 345/173 |
| 2003/0006986 | A1 * | 1/2003 | Dick | G06F 15/025 345/440 |
| 2004/0223002 | A1 * | 11/2004 | Fukaya | G06F 1/1626 345/619 |
| 2004/0227738 | A1 * | 11/2004 | Sudoh | G06F 3/0481 345/173 |
| 2005/0057579 | A1 * | 3/2005 | Young | G06T 19/20 345/649 |
| 2007/0046674 | A1 * | 3/2007 | Sudoh | G06F 3/0481 345/440 |
| 2008/0270936 | A1 * | 10/2008 | Bebrisson | G06F 3/0481 715/788 |
| 2011/0006876 | A1 * | 1/2011 | Moberg | G06F 19/3406 340/3.2 |
| 2011/0007097 | A1 * | 1/2011 | Williams | G06F 3/0481 345/661 |
| 2011/0090227 | A1 * | 4/2011 | De Brebisson | G06F 3/04812 345/440 |
| 2012/0188274 | A1 * | 7/2012 | Yoshizawa | G06T 11/60 345/629 |
| 2012/0245745 | A1 * | 9/2012 | Vandevelde | H02S 50/00 700/286 |
| 2013/0187948 | A1 * | 7/2013 | Yoshimoto | G06F 3/04883 345/629 |
| 2013/0227492 | A1 * | 8/2013 | Friedman | G06F 3/04845 715/848 |
| 2014/0055386 | A1 * | 2/2014 | Duheille | G06F 3/0488 345/173 |
| 2014/0129976 | A1 * | 5/2014 | Beaurepaire | G01C 21/367 715/788 |
| 2014/0149922 | A1 * | 5/2014 | Hauser | G06F 3/0485 715/784 |
| 2014/0229871 | A1 * | 8/2014 | Tai | G06F 3/0485 715/765 |
| 2014/0282276 | A1 * | 9/2014 | Drucker | G06F 17/245 715/863 |
| 2015/0160801 | A1 * | 6/2015 | Holt | G06F 3/0482 715/784 |
| 2016/0004423 | A1 * | 1/2016 | Springer | G06F 3/14 715/863 |
| 2016/0259830 | A1 * | 9/2016 | Li | G06F 17/30554 |

* cited by examiner

ELECTRONIC DEVICE, GRAPH DISPLAY METHOD AND STORAGE MEDIUM FOR PRESENTING AND MANIPULATING TWO DIMENSIONAL GRAPH OBJECTS USING TOUCH GESTURES

CROSS-REFERENCE TO RELATED APPLICATION

This application is based upon and claims the benefit of priority under 35 USC 119 of Japanese Patent Application No. 2013-122775 filed on Jun. 11, 2013, the entire disclosure of which, including the description, claims, drawings and abstract, is incorporated herein by reference in its entirety.

BACKGROUND OF THE INVENTION

1. Field of the Invention

The present invention relates to an electronic device, a graph display method and a storage medium to display graphs of function expressions.

2. Description of the Related Art

Nowadays, in an information device such as a mobile terminal or a mobile phone, a user interface which is a display screen provided with a touch panel is common, and the content in the display screen can be freely moved according to a point on the touch panel touched by a user and movement of the touch.

Also, a small electronic calculator (scientific calculator) having a function to calculate function expressions is highly functional and can display graphs or figures, and its display screen is provided with a touch panel.

As arts to scroll the display content which are applicable to this kind of display device provided with a touch panel, the followings have been conceived.

According to Japanese Patent Application Laid-Open Publication No. 2004-094596, there has been conceived a graphic display device which sets a direction of a scroll bar as set by a user, displays the scroll bar in the set direction and scrolls the display content in the set direction on the basis of a movement direction and a movement amount of a touch operation on the scroll bar.

Further, according to Japanese Patent Application Laid-Open Publication No. 2004-126759, there has been conceived a display device which displays a graph of a function expression, and when a trace pointer which moves on the graph is out of a display screen by a touch operation on a coordinate axis, scrolls the graph and the coordinate axis.

As known from these conventional display control devices each provided with a touch panel, there have been conceived some arts to scroll the content in a display screen according to a touch operation and display the content. However, a display control art which further increases usability is desired to be realized.

BRIEF SUMMARY OF THE INVENTION

The present invention has been conceived in view of the problems, and objects thereof include providing an electronic device, a graph display method and a storage medium to control a display state of a graph according to a user operation so as to make the graph easy to see, thereby increasing usability.

According to an aspect of the present invention, there is provided an electronic device including: a display device including a touch panel; and a processor which: generates a graph image to be displayed on the display device; when the generated graph image is displayed on the display device, acquires an object specified by a user, the object being contained in the graph image; and when the user performs a touch operation on the displayed graph image, changes a display style of the graph image according to a type of the acquired object and displays the graph image in the changed display style.

BRIEF DESCRIPTION OF THE DRAWINGS

The present invention is fully understood from the detailed description given hereinafter and the accompanying drawings, which are given byway of illustration only and thus are not intended to limit the present invention, wherein.

DETAILED DESCRIPTION OF THE PREFERRED EMBODIMENTS

In the following, an embodiment of the present invention is described with reference to the drawings.

Figure 1:
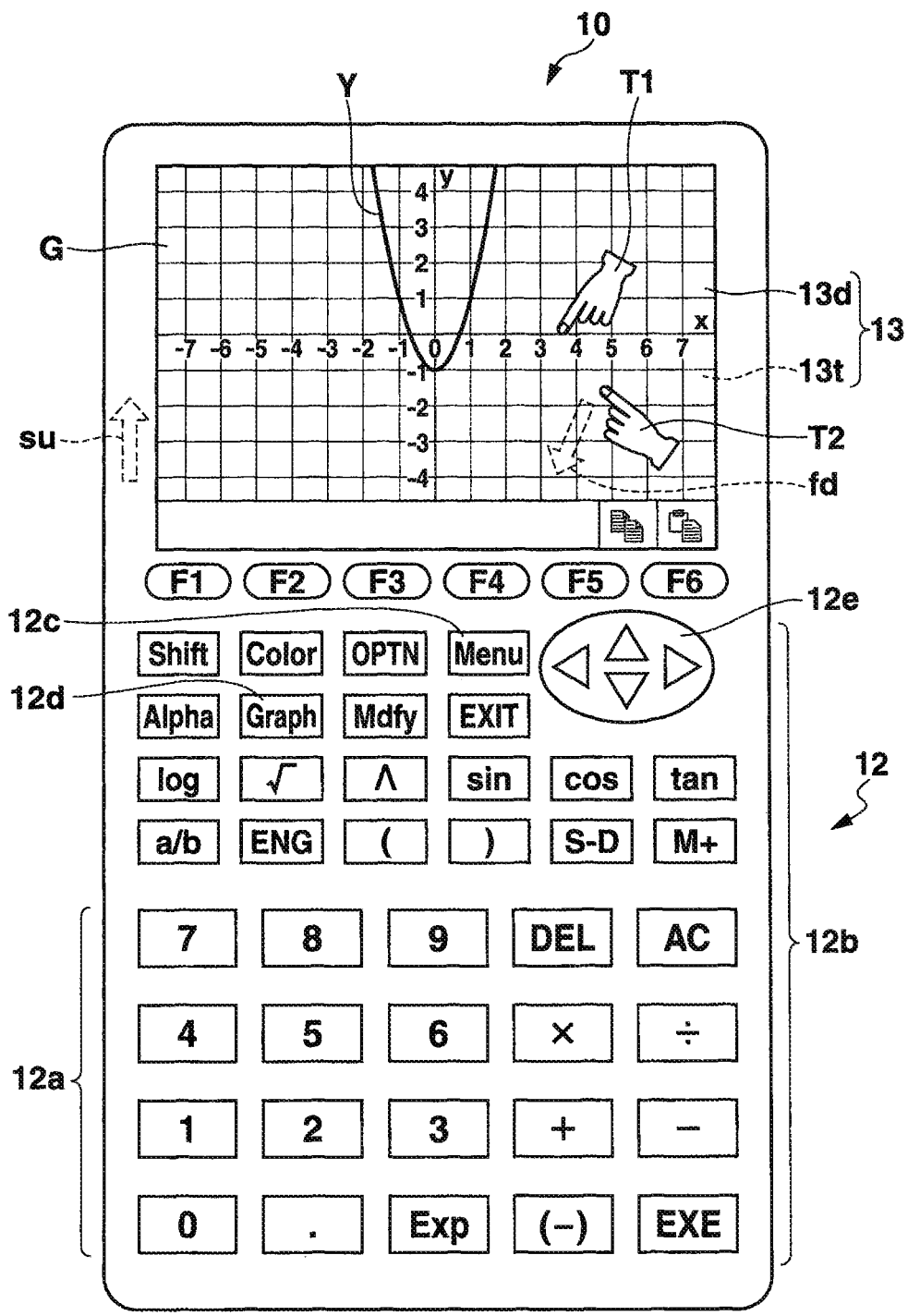
FIG. 1 is a front view of a graph scientific calculator 10 according to an embodiment of an electronic device of the present invention to show the external appearance of the graph scientific calculator 10.

FIG. 1 is a front view of a graph scientific calculator 10 according to an embodiment of an electronic device of the present invention to show the external appearance of the graph scientific calculator 10.

The electronic device may be realized as the graph scientific calculator 10 or a tablet terminal, a mobile phone, a mobile game machine or the like having a graph display function.

The graph scientific calculator 10 has a function to display a graph Y of a function expression y=f(x) when the function expression y=f(x) is input.

The graph scientific calculator 10 includes a key input unit 12 and a touch panel display unit 13. The key input unit 12 occupies an area of about two thirds of the front face of the graph scientific calculator 10 from the bottom. The touch panel display unit 13 occupies an area of about one third of the front face of the graph scientific calculator 10 from the top.

The key input unit 12 includes a numerical-value/symbol key set 12a, a function/operator key set 12b, a [Menu] key 12c, a [Graph] key 12d, a cursor key 12e and function keys F1 to F6.

The numerical-value/symbol key set 12a is a key set to input numerical values and symbols and is composed of keys for individual numbers, symbols and the like.

The function/operator key set 12b is composed of various function symbol keys and operator keys such as [+], [−], [×], [/] and [=] which are operated to input arithmetic expressions or function expressions.

The [Menu] key 12c is operated to display a menu to select and set an action mode of various action modes, such as an arithmetic mode for arithmetic processing with an input calculation formula, a graph mode for graph drawing of an input function expression, a spreadsheet mode for spreadsheeting and a program mode for calculation according to an input arbitrary program.

The [Graph] key 12d is operated to draw a graph based on input data.

The cursor key (↑, ↓, ←, →) 12e is operated, for example, to select displayed data, perform a sending operation or perform a cursor moving operation.

The function keys F1 to F6 are operated to select a menu from various menus which are arranged and displayed along the bottom of the display screen (13d) of the display unit 13 according to the selected (and set) action mode.

The touch panel display unit 13 is composed of a liquid crystal display screen 13d and a transparent touch panel 13t which is superposed on the liquid crystal display screen 13d. The liquid crystal display screen 13d has a display area of, for example, a width (in the vertical direction) of 186 dots×a length (in the horizontal direction) of 378 dots and is capable of color display.

The graph scientific calculator 10 has several functions activated in the graph mode, for example, a function to scroll a graph screen G in a direction along a coordinate axis of an x axis or a y axis according to a touch operation in a state in which the graph Y of the function expression $y=f(x)$ is displayed in the graph screen G, a function to scroll the graph screen G in a direction along a drawn line of the graph Y according to a touch operation in the state, and a function to enlarge or reduce the graph screen G according to a touch operation in the state.

Figure 2:
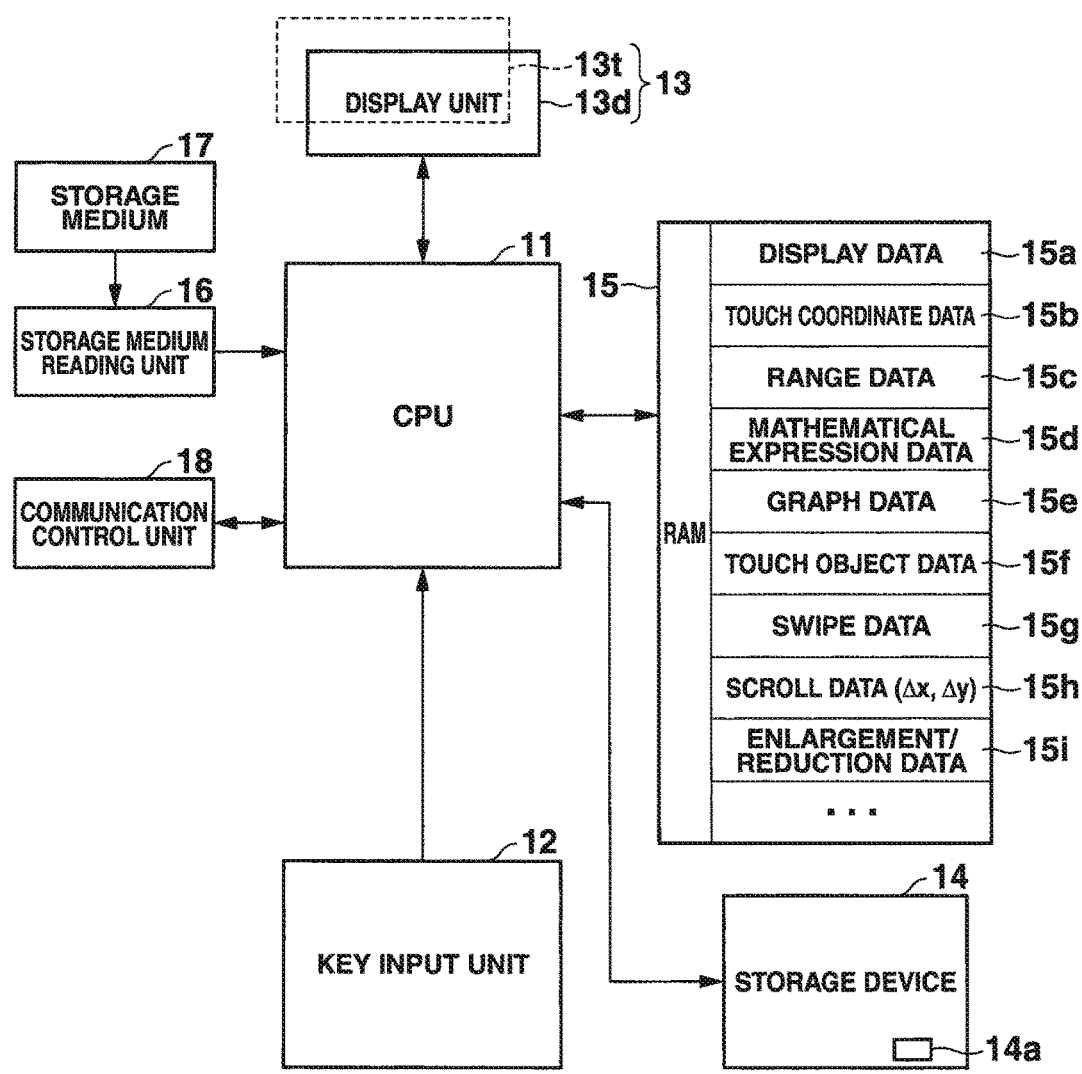
FIG. 2 is a block diagram showing a circuit configuration of the graph scientific calculator 10.

FIG. 2 is a block diagram showing a circuit configuration of the graph scientific calculator 10.

The graph scientific calculator 10 includes a CPU 11 which is a microcomputer.

The CPU 11 controls actions of components of the circuit to activate a calculator function or a function graph display function by executing a calculator control program 14a stored in advance in a storage device 14 such as a flash ROM, using a RAM 15 as a work memory. The calculator control program 14a maybe loaded from an external storage medium 17 such as a memory card into the storage device 14 via a storage medium reading unit 16 or downloaded from a Web server (program server) on a communication network (Internet) to the storage device 14 via a communication control unit 18.

To the CPU 11, the key input unit 12 and the touch panel display unit 13, which are shown in FIG. 1, and the storage device 14, the RAM 15, the storage medium reading unit 16, the communication control unit 18 and the like are connected.

The RAM 15 stores therein various data needed for the CPU 11 to act or perform processing. The RAM 15 is provided with a display data storage region 15a, a touch coordinate data storage region 15b, a range data storage region 15c, a mathematical expression data storage region 15d, a graph data storage region 15e, a touch object data storage region 15f, a swipe data storage region 15g, a scroll data storage region 15h and an enlargement/reduction data storage region 15i.

The display data storage region 15a stores therein data displayed in color on the display screen 13d of the touch panel display unit 13.

The touch coordinate data storage region 15b stores therein coordinate data of user touch points detected by the touch panel display unit 13.

The range data storage region 15c stores therein an X coordinate range (Xmin to Xmax) and a Y coordinate range (Ymin to Ymax) set for the graph screen G in the graph mode.

The mathematical expression data storage region 15d stores therein data relevant to the function expression $y=f(x)$ which is input through a user operation on the key input unit 12.

The graph data storage region 15e stores therein, on the basis of the function expression $y=f(x)$ stored in the mathematical expression data storage region 15d, data of the graph Y displayed in the coordinate ranges of the graph screen G, the coordinate range being stored in the range data storage region 15c.

The touch object data storage region 15f stores therein an object selected through user touch from among objects displayed in the graph screen G. In this embodiment, the objects are the x axis, the y axis, the graph Y, the origin "0" and the like which constitute the graph screen G.

The swipe data storage region 15g stores therein a swipe velocity calculated according to a user swipe (flick) operation on the touch panel display unit 13. The swipe velocity includes direction data and speed data. The "swipe" is a user operation of touching a touch panel with his/her finger, a pen or the like, and then quickly moving his/her finger or the like in an arbitrary direction while keeping the contact (touch) with the touch panel. This operation is sometimes referred to as a "flick".

The scroll data storage region 15h stores therein a change amount (Δx, Δy) per unit time (0.1 sec., for example) of the graph screen G by scrolling (screen scrolling) calculated on the basis of the swipe velocity.

The enlargement/reduction data storage region 15i stores therein a reduction percentage per unit time or an enlargement percentage per unit time of the graph screen G calculated on the basis of the swipe velocity.

The graph scientific calculator 10 thus configured realizes various functions, which are described below, by the CPU 11 controlling the actions of the components of the circuit following various processing instructions described in the calculator control program 14a and therefore by software and hardware working together.

Next, action of the graph scientific calculator 10 configured as described above is described.

Figure 3:
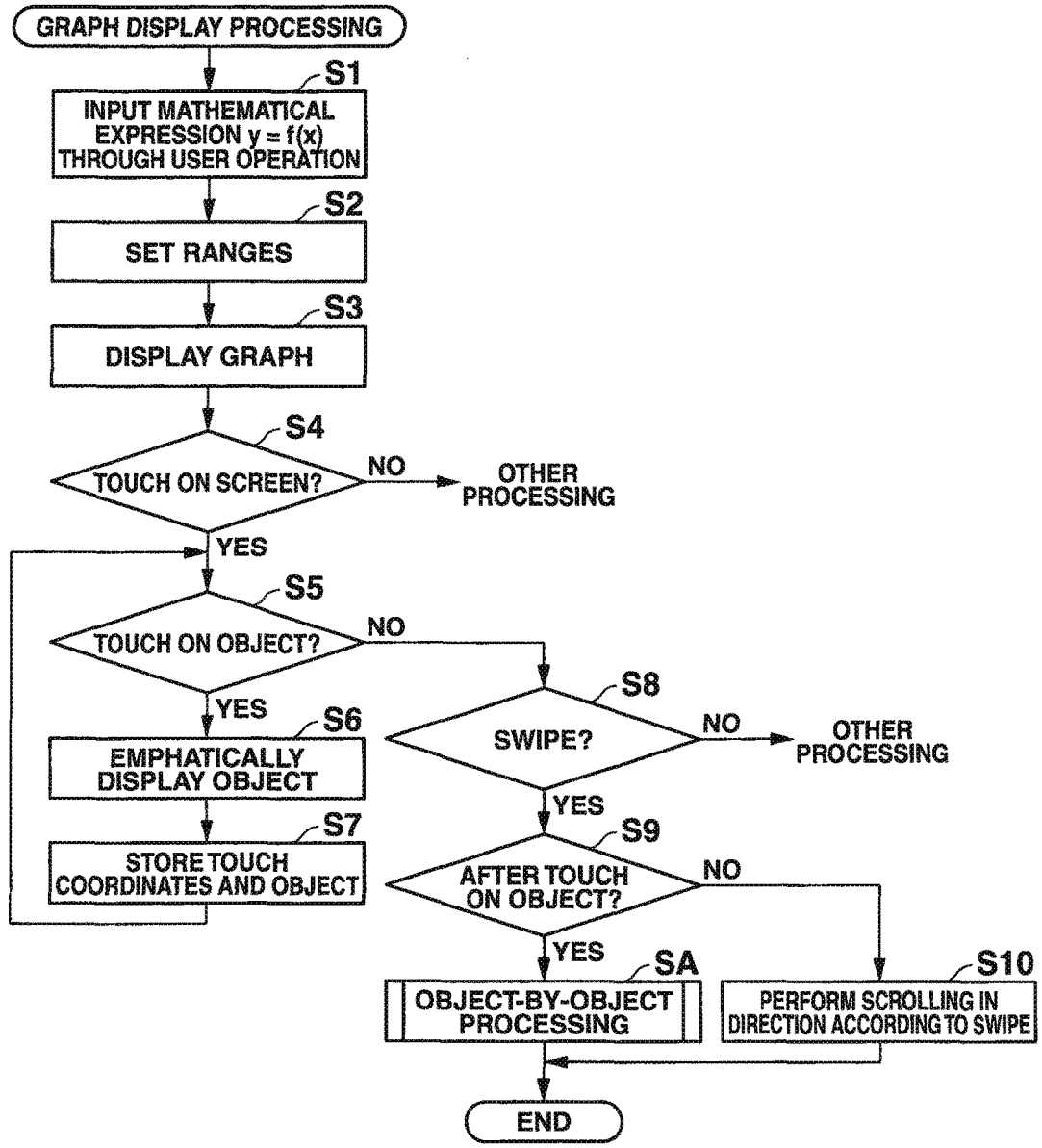
FIG. 3 is a flowchart of graph display processing of the graph scientific calculator 10.

FIG. 3 is a flowchart of graph display processing performed by the graph scientific calculator 10.

When the graph mode is selected on a menu screen (not shown) which is displayed in response to a user operation on the [Menu] key 12c, the graph display processing shown in FIG. 3 starts.

When a user inputs an arbitrary function expression $y=f(x)$ on a mathematical expression input screen (not shown) in the graph mode, the input function expression $y=f(x)$ is stored in the mathematical expression data storage region 15d (Step S1).

When the X coordinate range (Xmin to Xmax) and the Y coordinate range (Ymin to Ymax) are set on a coordinate range setting screen (not shown) as display ranges of the graph screen G, the set coordinate ranges are stored in the range data storage region 15c (Step S2).

When the [Graph] key 12d is operated, the graph screen G having an XY coordinate system corresponding to the set coordinate ranges is displayed on the touch panel display unit 13 as shown, for example, in FIG. 1. Then, drawing data for the graph Y of the input function expression y=f (x) is generated and stored in the graph data storage region 15e, and the graph Y is displayed on the XY coordinate system of the graph screen G (Step S3).

When a user touch operation T1 on the graph screen G is detected (Step S4; YES), it is determined whether or not any object (the x axis, the y axis, the graph Y, the origin "0", etc.) in the graph screen G is touched (Step S5).

When it is determined that an object in the graph screen G is touched (Step S5; YES), the object determined to be touched is emphatically displayed by blinking, changing its color, or the like (Step S6), and correlated with touch coordinates of the touch (touch operation T1) and stored in the touch object data storage region 15f (Step S7).

When it is determined that no object is touched (Step S5; NO) but the touch operation T1 is a swipe operation T2 (Step S8; YES), it is determined, on the basis of whether or not any object is stored in the touch object data storage region 15f, whether or not the swipe operation T2 is after a touch (touch operation T1) on an object (Step S9).

When it is determined that the swipe operation T2 is not after a touch on an object (Step S9; NO), normal scrolling is performed, the normal scoring scrolling the graph screen G in a direction according to the direction of the swipe operation T2 by a change amount of the graph screen G according to the speed of the swipe operation T2 (Step S10). This processing (Step S10) is performed by repeating processing of (i) changing the coordinate ranges according to the direction and speed of the swipe operation T2 and (ii) redrawing the graph Y.

On the other hand, when it is determined that the swipe operation T2 is after a touch on an object (Step S9; YES), the object-by-object processing shown in FIG. 4 starts (Step SA).

The object-by-object processing is described with reference to the flowchart of FIG. 4.

Figure 5A:
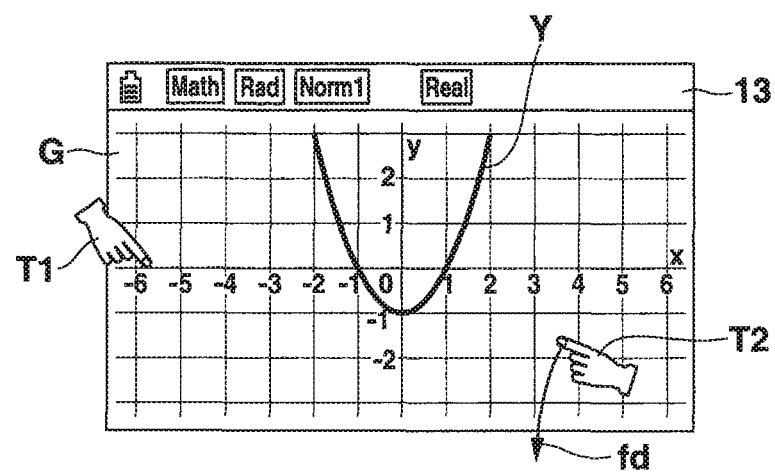
FIGS. 5A and 5B show display examples displayed by screen scrolling along a y axis in the graph display processing of the graph scientific calculator 10.

For example, as shown in FIG. 5A, in a state in which a function expression "y=$x^2$−1" is input and the graph Y thereof is displayed (Steps S1 to S3), a user touches (a touch operation T1) the x axis and then performs a swipe operation (T2) in a downward direction fd.

When the user performs the touch operation T1 on the x axis, the x axis is stored in the touch object data storage region 15f (Steps S4 to S7). Then, when the user performs the swipe operation T2 on the graph screen G in the downward direction fd (Steps S8 and S9; YES), the object-by-object processing (Step SA, shown in FIG. 4) starts. In the object-by-object processing, first, it is determined what type of object the stored object is (Step A1). Here, the stored object is determined to be the "x axis" (Step A1).

Next, from touch coordinates corresponding to the locus of the swipe operation T2 in the downward direction fd stored in the touch coordinate data storage region 15b and their recorded (stored) times, the swipe velocity of the downward component of the y axis is calculated and stored in the swipe data storage region 15g (Step A2).

Then, on the basis of the calculated swipe velocity, the change amount (Δx, Δy) per unit time by screen scrolling in the downward direction of the y axis is calculated and stored in the scroll data storage region 15h (Step A3). Here, Δx is 0, and Δy is a positive value.

Figure 5B:
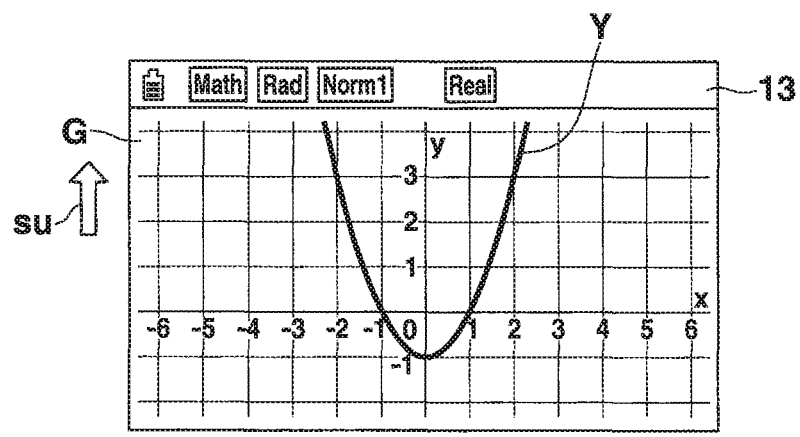

Next, the coordinate ranges of the graph screen G are changed in the upward direction, which is along the y axis, by following the change amount (Δx (=0), Δy) by screen scrolling, and the graph Y is redrawn and displayed in response to the change of the coordinate ranges (Step A4). By repeating this processing of Step A4 until a predetermined movement amount is reached, as shown in FIG. 5B, the graph screen G is scrolled (su) in the upward direction along the y axis and displayed (Steps A4 and A5).

When it is determined that the movement amount by the scrolling su has reached the predetermined movement amount (Step A5; YES), the scrolling su stops (Step A6).

Consequently, by a user touching the x axis in the graph screen G, thereby instructing fixation of the x axis direction, and then performing a swipe operation in the downward direction or the upward direction, even if the direction of the swipe operation is not exactly along the y axis direction, the graph screen G can be scrolled only in the y axis direction and displayed. Therefore, the scrolling which makes the graph screen G easy to see can be realized.

On the other hand, when it is determined that the user touches the y axis and then performs the swipe operation T2 in the right direction (Steps S8 and S9; YES), the object-by-object processing (Step SA, shown in FIG. 4) starts, and the stored object is determined to be the "y axis" (Step A1).

Next, from touch coordinates corresponding to the locus of the swipe operation T2 in the right direction, the touch coordinates being stored in the touch coordinate data storage region 15b in response to the swipe operation T2, and their recorded times, the swipe velocity of the rightward component of the x axis is calculated and stored in the swipe data storage region 15g (Step A7).

Then, on the basis of the swipe velocity stored in the swipe data storage region 15g, the change amount (Δx, Δy) per unit time by screen scrolling in the right direction of the x axis is calculated and stored in the scroll data storage region 15h (Step A8). Here, Δy is 0, and Δx is a negative value.

Next, the coordinate ranges of the graph screen G are changed in the left direction, which is along the x axis, by following the change amount (Δx, Δy (=0)) by screen scrolling, and the graph Y is redrawn and displayed in response to the change of the coordinate ranges (Step A9). By repeating this processing of Step A9 until a predetermined movement amount is reached, the graph screen G is scrolled in the left direction along the x axis and displayed (Steps A9 and A10).

When it is determined that the movement amount by the scrolling of the graph screen G along the x axis has reached the predetermined movement amount (Step A10; YES), the scrolling stops (Step A6).

Consequently, by a user touching the y axis, thereby instructing fixation of the y axis direction, and then performing a swipe operation in the right direction or the left direction, even if the direction of the swipe operation is not exactly along the x axis direction, the graph screen G can be scrolled only in the x axis direction and displayed.

Figure 6A:
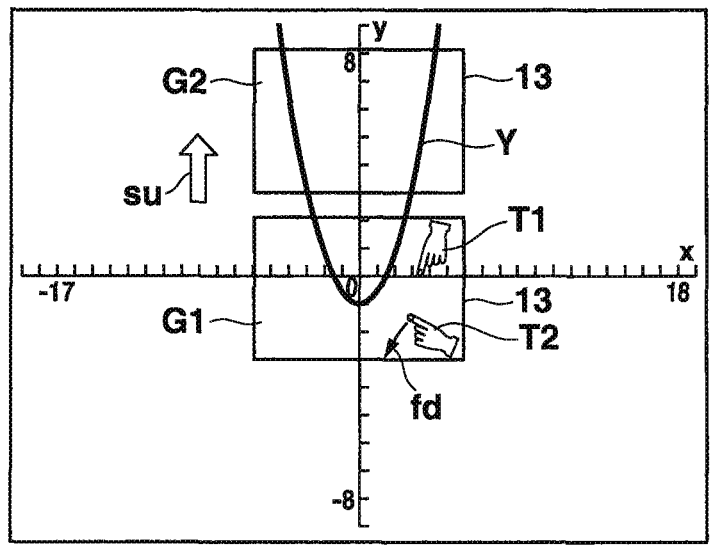
FIGS. 6A and 6B are illustrations to explain screen scrolling in the graph display processing of the graph scientific calculator 10.
Figure 6B:
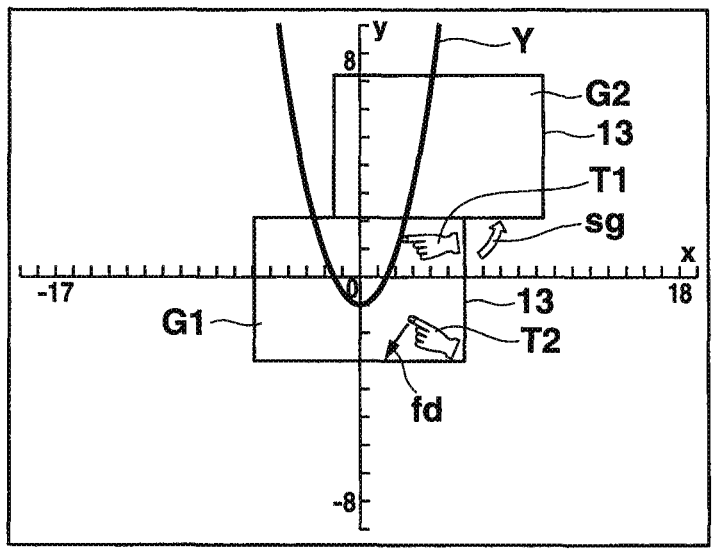

FIGS. 6A and 6B are illustrations to explain screen scrolling, using a graph image corresponding to a function expression. FIGS. 6A and 6B each show a graph Y image corresponding to a function expression "y=(1/2)$x^2$−1" on the XY coordinate system in relation to changing coordinate ranges (graph screen G).

When an X coordinate range of −6 to 6 and an Y coordinate range of −3 to 2 are set as the coordinate ranges, the graph Y of the function expression "y=(1/2)$x^2$−1" is displayed as a graph screen G1 as shown in FIG. 6A.

When a user performs a touch operation T1 on the x axis and performs a swipe operation T2 on the graph screen G1 in a downward direction fd, the above-described scrolling (su) in the y axis direction is performed, whereby the coordinate ranges are successively changed in the upward direction along the y axis. The scrolling su continues until the coordinate ranges become an X coordinate range of −6 to 6 and a Y coordinate range of 3 to 8, namely, until a graph screen G2 is reached, whereby the graph screen G2 is displayed.

Next, the case where a user touches the displayed graph Y and then performs a swipe operation is described with reference to FIG. 6B.

When a user performs a touch operation T1 on the graph Y of the function expression "$y=(1/2)x^2-1$" displayed in the graph screen G1, the graph Y is stored in the touch object data storage region 15f (Steps S4 to S7). Then, when it is determined that the user performs a swipe operation T2 in a left-downward direction fd (Steps S8 and S9; YES), the object-by-object processing (Step SA, shown in FIG. 4) starts, and the stored object is determined to be the "graph Y" (Step A1).

Then, first, coordinates of a specific point on the graph Y are identified, the specific point being touched by the user through the touch operation T1 (Step A12). Next, on the basis of the direction and speed of the swipe operation T2, it is determined how much X is moved in which direction, and the next point on the graph Y is calculated (Step A13). In this case, because the swipe operation T2 is performed in the left-downward direction, coordinates of the next point on the graph Y in the graph screen having the increased values of X by Δx to move in the right direction are calculated.

Then, on the basis of the identified coordinates of the specific point on the graph Y and the calculated coordinates of the next point, the change amount (Δx, Δy) of the display screen along the graph Y is calculated and stored in the scroll data storage region 15h (Step A14).

Then, the coordinate ranges of the graph screen G1 are changed by following the change amount (Δx, Δy), and the graph Y is redrawn (Step A15). The scrolling along the graph Y is performed by repeating Step A13 of calculating the next point on the graph Y while keeping Δx, Step A14 of calculating the change amount of the graph screen, and Step A15 of changing the coordinate ranges and redrawing the graph Y.

When it is determined that the movement amount by the scrolling along the graph Y has reached a predetermined movement amount, the coordinate ranges become an X coordinate range of −1.5 to 10.5 and a Y coordinate range of 2 to 7, whereby the graph screen G2 has been reached (Step A16; YES), the scrolling stops (Step A17).

Consequently, by a user touching the graph Y in the graph screen G and then performing a swipe operation in the downward direction or the upward direction, the graph screen G can be scrolled along the touched graph Y and displayed. Next, the case where a user touches the origin of the XY coordinate system and then performs a swipe operation is described with reference to FIG. 7.

Figure 7:
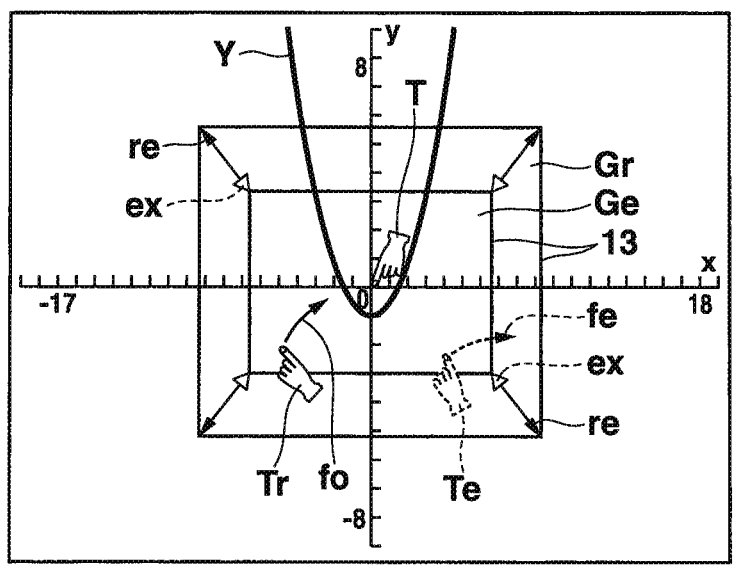
FIG. 7 is an illustration to explain screen enlargement and screen reduction in the graph display processing of the graph scientific calculator 10.

FIG. 7 shows a screen reduction action re and a screen enlargement action ex. The screen reduction action re is performed when a user performs a touch operation T on the origin "0" of a graph screen Ge in which the graph Y of the function expression "$y=(1/2)x^2-1$" is displayed and then performs a swipe operation Tr on the graph screen Ge in an origin direction fo to approach the origin "0". The screen enlargement action ex is performed when a user performs a touch operation T on the origin "0" of a graph screen Gr in which the graph Y of the function expression "$y=(1/2)x^2-1$" is displayed and then performs a swipe operation Te on the graph screen Gr in an origin-away direction fe to be away from the origin "0".

When an X coordinate range of −6.5 to 6.5 and a Y coordinate range of −3 to 3.5 are set as the coordinate ranges, the graph Y is displayed as the graph screen Ge. When it is determined that the user touches the origin "0" and then performs the swipe operation Tr in the origin direction (screen-inward direction) fo (Steps S8 and S9; YES), the object-by-object processing (Step SA, shown in FIG. 4) starts, and the stored object is determined to be the "origin" (Step A1).

Then, from touch coordinates corresponding to the locus (fo) of the swipe operation Tr, the direction of the swipe operation Tr is determined to be the origin direction (Step A18; YES).

Next, the swipe velocity is calculated from the touch coordinates corresponding to the locus of the swipe operation Tr and their recorded times, and the reduction percentage of the graph screen Ge is calculated on the basis of the swipe velocity and stored in the enlargement/reduction data storage region 15i (Step A19).

Next, the coordinate ranges of the graph screen Ge are changed to values for screen reduction (in a direction to narrow an interval of coordinate gradations displayed in the display screen 13d) by following the reduction percentage stored in the enlargement/reduction data storage region 15i, and the graph Y is redrawn and displayed (Step A20). By repeating this processing of Step A20, the coordinate ranges are successively changed as indicated by an arrow re, and the graph screen Ge is reduced until a predetermined reduction amount is reached, whereby the reduced graph screen (Gr) is displayed (Steps A20 and A21).

When it is determined that the graph screen Ge is reduced to the graph screen Gr (an X coordinate range of −9 to 9 and a Y coordinate range of −5 to 5.5) (Step A21; YES), the reduction stops (Step A22).

Consequently, by a user touching the origin "0" in the graph screen Ge and then performing a swipe operation in the origin direction, the graph screen Ge can be reduced by the reduction percentage based on the swipe velocity, and the reduced graph screen (Gr) is displayed.

On the other hand, when it is determined that the user touches the origin "0" and then performs the swipe operation Te in the origin-away direction (screen-outward direction) fe (Steps S8 and S9; YES), the object-by-object processing (Step SA, shown in FIG. 4) starts, and the stored object is determined to be the "origin" (Step A1).

When, from touch coordinates corresponding to the locus (fe) of the swipe operation Te, the direction of the swipe operation Te is determined not to be the origin direction (Step A18; NO), the object-by-object processing moves to Step A23.

Then, the swipe velocity is calculated from the touch coordinates corresponding to the locus of the swipe operation Te and their recorded times, and the enlargement percentage of the graph screen Gr is calculated on the basis of the swipe velocity and stored in the enlargement/reduction data storage region 15i (Step A23).

Next, the coordinate ranges of the graph screen Gr are changed to values for screen enlargement (in a direction to widen an interval of coordinate gradations in the display screen 13d) by following the enlargement percentage stored in the enlargement/reduction data storage region 15i, and the graph Y is redrawn and displayed (Step A24). By repeating the processing of Step A24, the coordinate ranges are successively changed as indicated by an arrow ex, and the graph screen Gr is enlarged until a predetermined enlargement amount is reached, whereby the enlarged graph screen (Ge) is displayed (Steps A24 and A25).

When it is determined that the graph screen Gr is enlarged to the graph screen Ge (an X coordinate range of −6.5 to 6.5 and a Y coordinate range of −3 to 3.5) (Step A25; YES), the enlargement stops (Step A26).

Consequently, by a user touching the origin "0" in the graph screen Gr and then performing a swipe operation in the origin-away direction, the graph screen Gr can be enlarged by the enlargement percentage based on the swipe velocity, and the enlarged graph screen (Ge) is displayed.

According to the embodiment of the present invention, there can be provided an electronic device which is capable of desired display change by a user specifying an object in a displayed graph image and then performing a touch operation.

Figure 4:
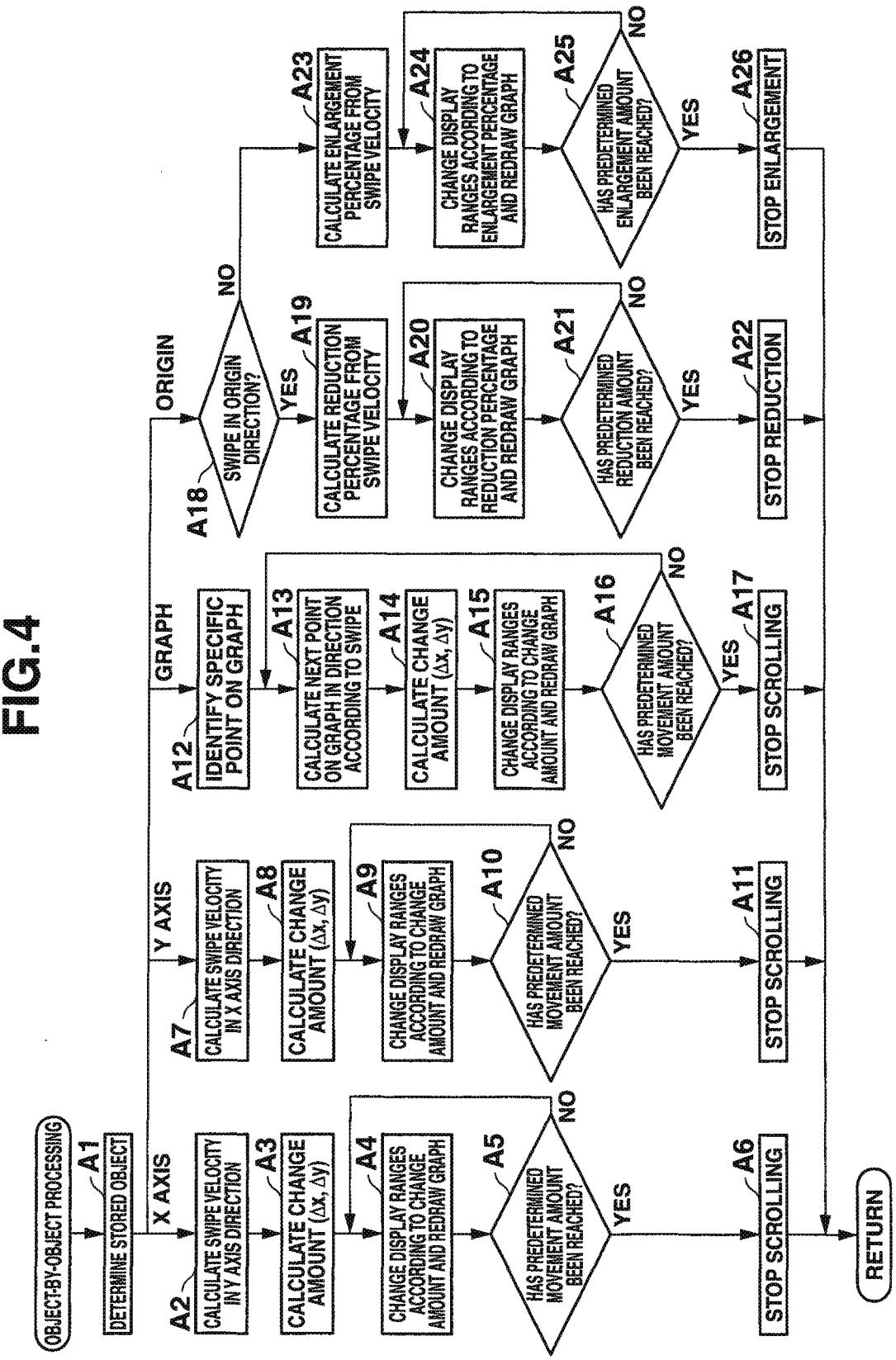
FIG. 4 is a flowchart of object-by-object processing in the graph display processing of the graph scientific calculator 10.

The action methods by the graph scientific calculator 10 described in the embodiment, such as the methods of the graph display processing shown by the flowchart of FIG. 3 and the object-by-object processing shown by the flowchart of FIG. 4, can be distributed as a computer executable program by being stored in a storage medium (storage medium 17), such as a memory card (ROM card, RAM card, etc.), a magnetic disk (flexible disk, hard disk, etc.), an optical disk (CD-ROM, DVD, etc.) or a semiconductor memory. A computer (CPU 11) of an electronic calculator (10) having a graph display function can perform the same types of processing as those described above with the above-described methods, by reading the program stored in the storage medium.

Data of the program to realize the above-described methods can be transmitted via a communication network (public line) in the form of a program code. A computer (CPU 11) of an electronic calculator (10) having a graph display function can perform the same types of processing as those described above with the above-described method, by receiving the program with a communication device (communication control unit 18) connected to the communication network.

In the above, as an embodiment of the electronic device, described is the graph scientific calculator 10 as a device for exclusive use performs all the actions (steps) of the graph display processing. However, the electronic device may be configured as a server device of a cloud system.

That is, in this case, a server device receives an arbitrary function expression y=f(x) input by a user with a terminal device such as a tablet terminal having a user interface, generates a graph screen G having the graph Y of the function expression, and outputs its display data to the terminal device so as to display the graph screen G (graph Y) thereon. When receiving positional information about a touch operation on an object (the x axis, the y axis, the graph Y or the origin) in the graph screen G and locus information about a swipe operation from the terminal device, the server device generates the scrolled, enlarged or reduced graph screen according to the type of the object on which the touch operation is performed and the direction and speed of the swipe operation as with the above embodiment, and outputs the generated graph screen to the terminal device so as to display the graph screen thereon.

Consequently, even if a terminal device has no special function, by accessing the server device, the terminal device can display the graph Y of a function expression input by a user and can realize scrolling, enlargement and reduction each of which makes the graph screen G very easy to see by a user performing a touch operation on an object among objects of various types in the graph screen G and then performing a swipe operation.

The present invention is not limited to the above embodiments, and in the implementation phase, the components of the present invention can be modified and embodied without departing from the scope of the present invention. Further, the components described in the embodiments may be appropriately and selectively combined. For example, some components of all the components of an embodiment may be removed or some components of the components of different embodiments may be combined appropriately.

What is claimed is:

1. An electronic device comprising:
   a display device including a touch panel; and
   a processor which:
      generates a graph screen that includes a two-dimensional graph image as an object of one or more objects therein;
      displays the graph screen on the display device;
      when a touch operation onto one of the objects in the graph screen on the touch panel is detected, stores the touched object in a memory in relation with coordinates of the touch position and, when a swipe operation separate and distinct from the touch operation on the touch panel is detected after detection of the touch operation, executes at least one of a plurality of processes different from each other in accordance with the touched object stored in the memory;
      wherein the graph screen further includes and displays an x axis and a y axis as additional objects of the one or more objects therein, the generated graph screen including only the x axis and the y axis as the axes of the graph screen displayed on the display device, and when the touched object is one of the x axis and the y axis, the executed process comprises:
      redrawing the graph screen on the display device to scroll the graph screen in a direction of the other of the x axis and the y axis in accordance with a direction and a speed of the swipe operation detected after detection of the touch operation on the one of the x axis and the y axis, the direction of the swipe operation being at least generally along the other of the x axis and the y axis and the graph screen being redrawn so that coordinate ranges along the other of the x-axis and y-axis are changed by an amount which is based on the direction and the speed of the swipe operation; and
      when a swipe operation on the touch panel is detected and a separate and distinct touch operation is not detected before the swipe operation, redraws the graph screen on the display device to scroll the graph image in accordance with a direction and a speed of the swipe operation.

2. The electronic device according to claim 1, wherein the processor further:
   generates the graph screen that further includes a coordinate origin as another one of the objects therein; and
   when the touched object stored in the memory is the coordinate origin, (i) redraws the graph screen to be enlarged when the swipe operation detected is in the direction away from the coordinate origin, and (ii) redraws the graph screen to be reduced when the swipe operation detected is in the direction approaching the coordinate origin.

3. A graph display method for an electronic device including a touch panel-attached display device, comprising the steps of:

generating a graph screen that includes a two-dimensional graph image as an object of one or more objects therein;

displaying the graph screen on the display device;

when a touch operation onto one of the objects in the graph screen on the touch panel is detected, storing the touched object in a memory in relation with coordinates of the touch position and, when a swipe operation separate and distinct from the touch operation on the touch panel is detected after detection of the touch operation, executing at least one of a plurality of processes different from each other in accordance with the touched object stored in the memory;

wherein the graph screen further includes and displays an x axis and a y axis as additional objects of the one or more objects therein, the generated graph screen including only the x axis and the y axis as the axes of the graph screen displayed on the display device, and when the touched object is one of the x axis and the y axis, the executed process comprises:

redrawing the graph screen on the display device to scroll the graph screen in a direction of the other of the x axis and the y axis in accordance with a direction and a speed of the swipe operation detected after detection of the touch operation on the one of the x axis and the y axis, the direction of the swipe operation being at least generally along the other of the x axis and the y axis and the graph screen being redrawn so that coordinate ranges along the other of the x-axis and y-axis are changed by an amount which is based on the direction and the speed of the swipe operation; and when a swipe operation on the touch panel is detected and a separate and distinct touch operation is not detected before the swipe operation, redrawing the graph screen on the display device to scroll the graph image in accordance with a direction and a speed of the swipe operation.

4. The graph display method according to claim 3, further comprising:

generating the graph screen to further include a coordinate origin as another one of the objects therein; and when the touched object stored in the memory is the coordinate origin, (i) redrawing the graph screen to be enlarged when the swipe operation detected is in the direction away from the coordinate origin, and (ii) redrawing the graph screen to be reduced when the swipe operation detected is in the direction approaching the coordinate origin.

5. A non-transitory computer readable storage medium having stored thereon a program to be executed by a computer of an electronic device including a touch panel-attached display device, the program causing the computer to:

generate a graph screen that includes a two-dimensional graph image and an x axis or a y axis as objects therein;

display the graph screen on the display device;

when detecting a touch operation onto the touch panel, determine which one of the objects displayed in the graph screen is touched;

when a swipe operation onto on object in the graph screen on the touch panel is detected, store the touched object in a memory in relation with coordinates of the touch position and, when a swipe operation separate and distinct from the touch operation on the touch panel is detected after detection of the touch operation, execute at least one of a plurality of processes different from each other in accordance with the touched object stored in the memory;

wherein the graph screen further includes and displays an x axis and a y axis as additional objects of the one or more objects therein, the generated graph screen including only the x axis and the y axis as the axes of the graph screen displayed on the display device, and when the touched object is one of the x axis and the y axis, the executed process comprises:

redrawing the graph screen on the display device to scroll the graph screen in a direction of the other of the x axis and the y axis in accordance with a direction and a speed of the swipe operation detected after detection of the touch operation on the one of the x axis and the y axis, the direction of the swipe operation being at least generally along the other of the x axis and the y axis and the graph screen being redrawn so that coordinate ranges along the other of the x-axis and y-axis are changed by an amount which is based on the direction and the speed of the swipe operation; and when a swipe operation on the touch panel is detected and a separate and distinct touch operation is not detected before the swipe operation, redraw the graph screen on the display device to scroll the graph image in accordance with a direction and a speed of the swipe operation.

6. The non-transitory computer readable storage medium according to claim 5, wherein the program causes the computer to, generate the graph screen that further includes a coordinate origin as another one of the objects therein; and when the touched object stored in the memory is the coordinate origin, (i) redraw the graph screen to be enlarged when the swipe operation detected is in the direction away from the coordinate origin, and (ii) redraw the graph screen to be reduced when the swipe operation detected is in the direction approaching the coordinate origin.

7. The electronic device according to claim 1, wherein the processor further:

executes a process, as the at least one of the plurality of processes, that, when the touched object stored in the memory is the graph image in the graph screen, redraws the graph screen on the display device to scroll along the graph image in accordance with a direction and a speed of the swipe operation.

8. The graph display method according to claim 3, further comprising:

executing a process, as the at least one of the plurality of processes, that, when the touched object stored in the memory is the graph image in the graph screen, redraws the graph screen on the display device to scroll along the graph image in accordance with a direction and a speed of the swipe operation.

9. The non-transitory computer readable storage medium according to claim 5, wherein the program causes the computer to, execute a process, as the at least one of the plurality of processes, that, when the touched object stored in the memory is the graph image in the graph screen, redraws the graph screen on the display device to scroll along the graph image in accordance with a direction and a speed of the swipe operation.

* * * * *